United States Patent [19]

Butlin et al.

[11] Patent Number: 5,141,694
[45] Date of Patent: Aug. 25, 1992

[54] PROCESS FOR INSERT MOLDING WET-SHAVING RAZOR UNIT

[75] Inventors: C. Edward Butlin; Edward S. Butlin, both of Erie, Pa.; William T. Conrad, Jr., Shelton, Conn.

[73] Assignee: Warner-Lambert Company, Morris Plains, N.J.

[21] Appl. No.: 541,225

[22] Filed: Jun. 20, 1990

Related U.S. Application Data

[63] Continuation-in-part of Ser. No. 165,859, Mar. 9, 1988, abandoned, and a continuation-in-part of Ser. No. 88,388, Aug. 21, 1987, abandoned, and a continuation-in-part of Ser. No. 42,493, Apr. 24, 1987, Pat. No. 5,053,178, and a continuation-in-part of Ser. No. 236,969, Apr. 26, 1988.

[51] Int. Cl.⁵ .................. B29C 41/20; B29C 45/14
[52] U.S. Cl. ........................ 264/250; 264/261; 264/275
[58] Field of Search ............ 264/249, 250, 255, 261, 264/267, 275, 277, 278, 279, 334; 29/509; 156/245; 427/256, 284

[56] References Cited

U.S. PATENT DOCUMENTS

| 2,789,346 | 4/1957 | Algier | 30/41 |
| 3,070,883 | 1/1963 | Grathwohl | 30/32 |
| 3,703,765 | 11/1972 | Perez | 30/41 |
| 3,738,000 | 6/1973 | Samko | 30/32 |
| 4,489,627 | 12/1984 | Lembke | 76/104.1 |
| 4,624,051 | 11/1986 | Apprille, Jr. et al. | 30/50 |
| 4,634,565 | 1/1987 | Irrgang | 264/510 |
| 4,683,096 | 7/1987 | Ferraro | 264/249 |
| 4,778,640 | 10/1988 | Braun et al. | 264/250 |

FOREIGN PATENT DOCUMENTS

| 1473527 | 3/1967 | France . |
| 1251905 | 11/1971 | United Kingdom . |
| 1565296 | 4/1980 | United Kingdom . |
| 2050912 | 1/1981 | United Kingdom . |

Primary Examiner—Leo B. Tentoni
Attorney, Agent, or Firm—Richard S. Bullitt

[57] ABSTRACT

The present invention is a wet-shaving unit and a process for making same by injection molding. The present invention is adaptable for addition to conventional razor blade manufacturing methods and existing manufacturing apparatus and facilities. Moreover, the present process results in a product which significantly reduces or eliminates entirely undesirable blade distortion and vibration.

4 Claims, 12 Drawing Sheets

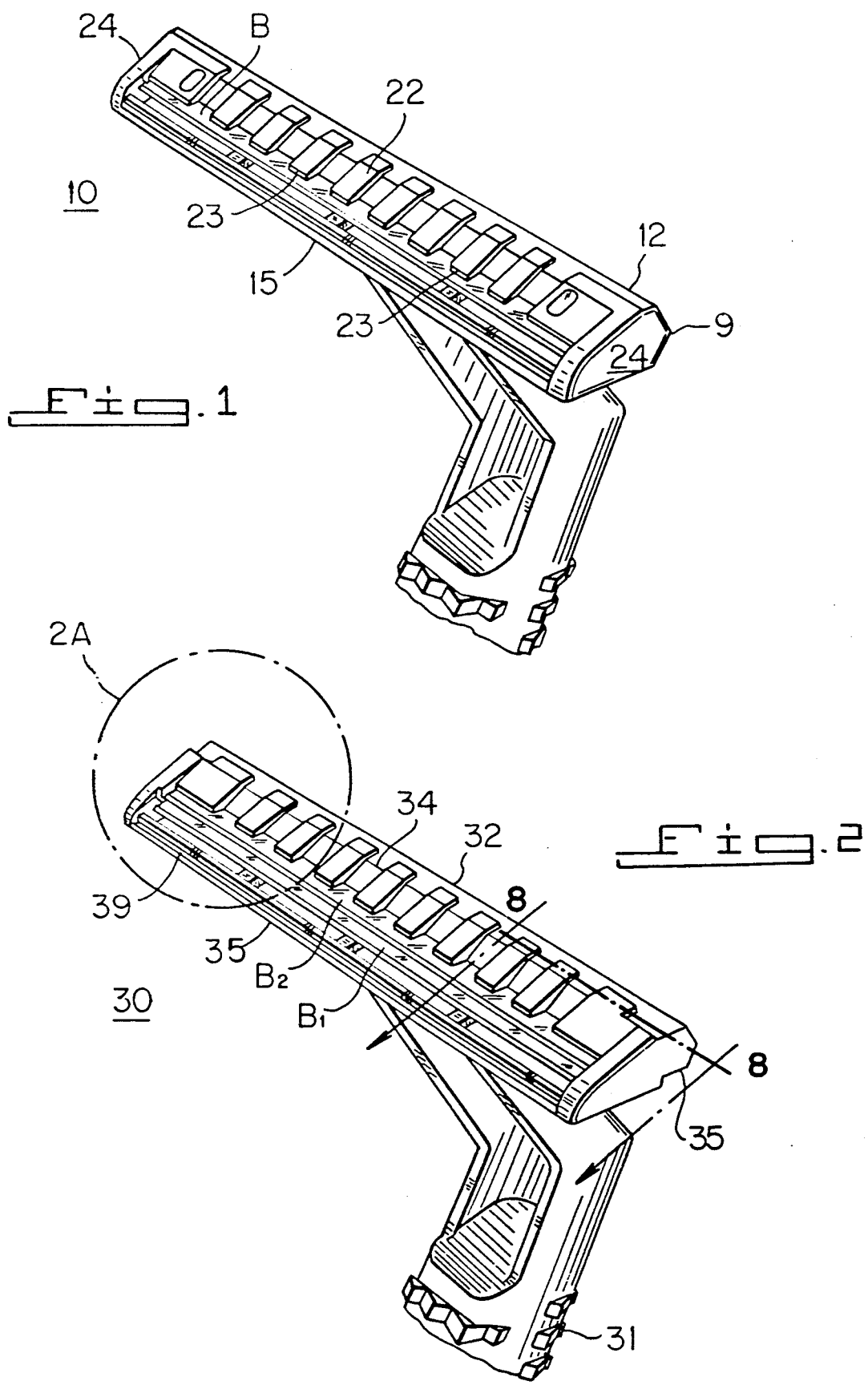

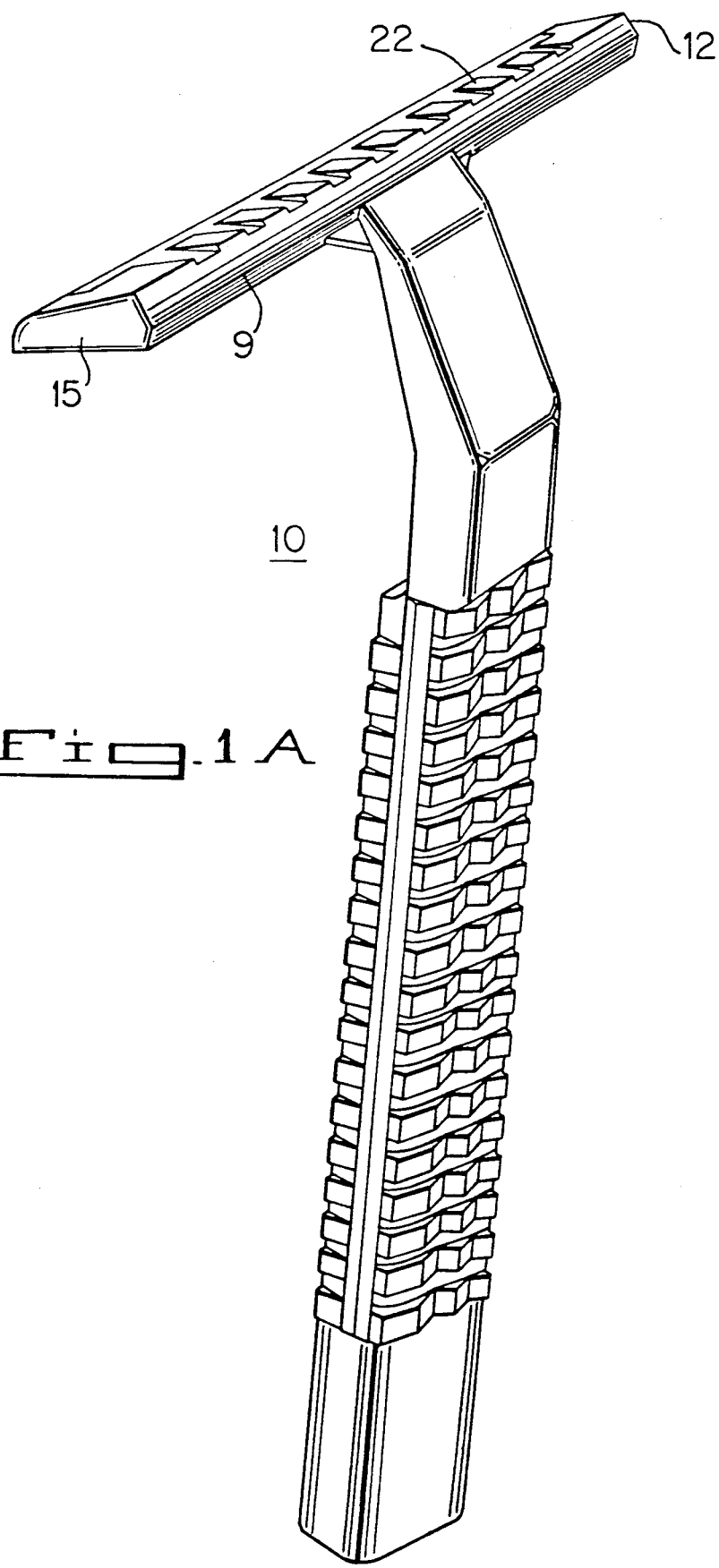

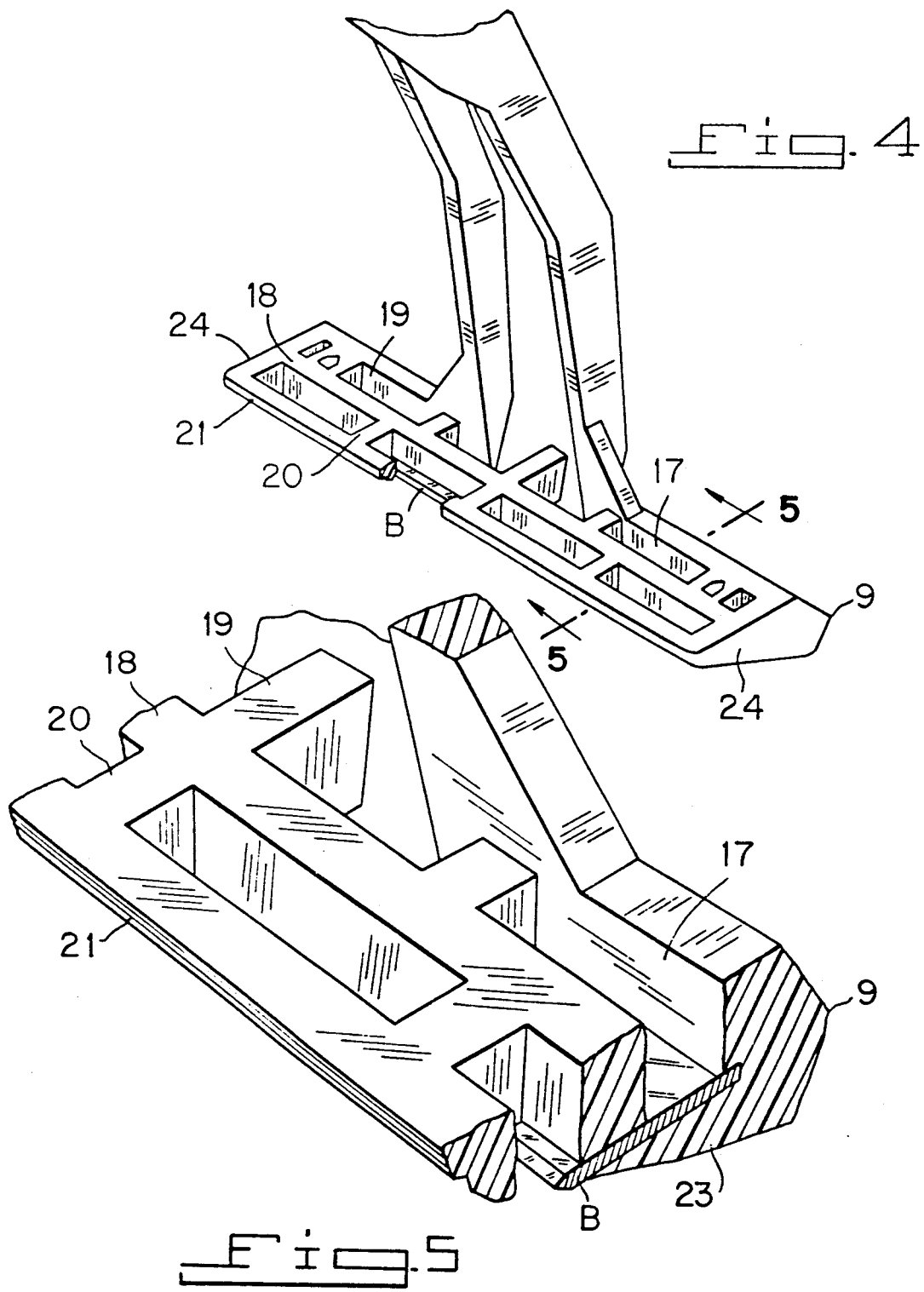

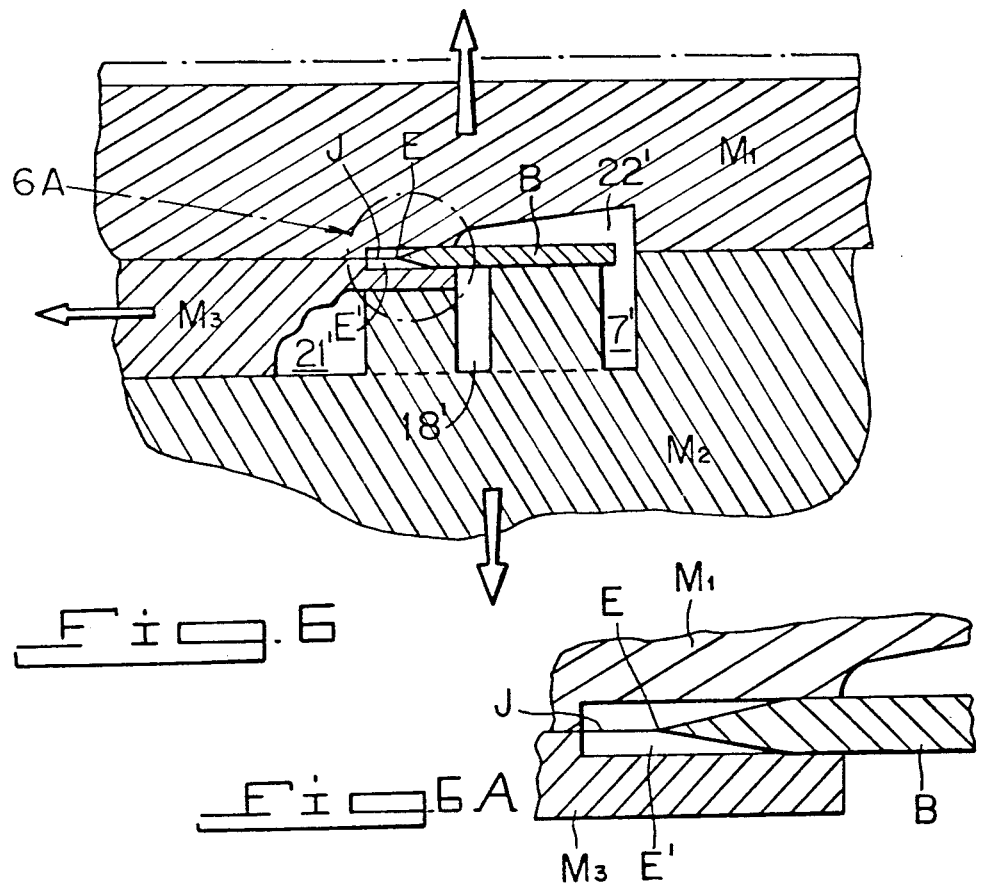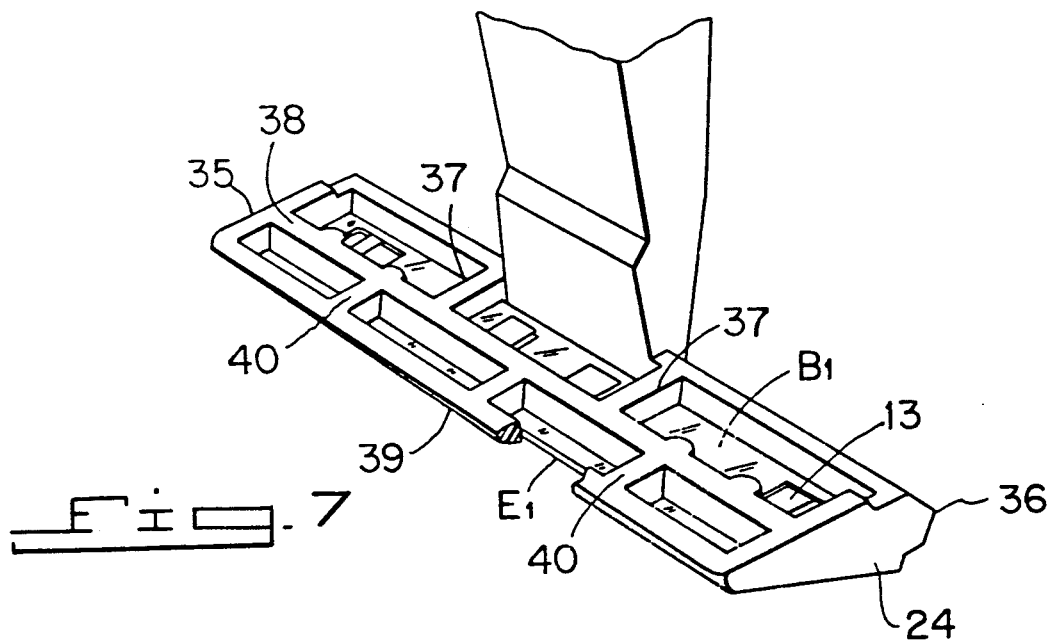

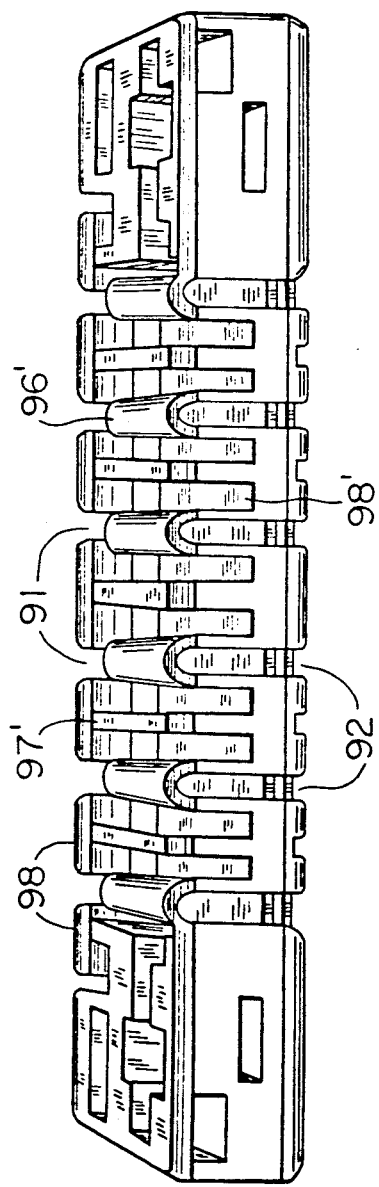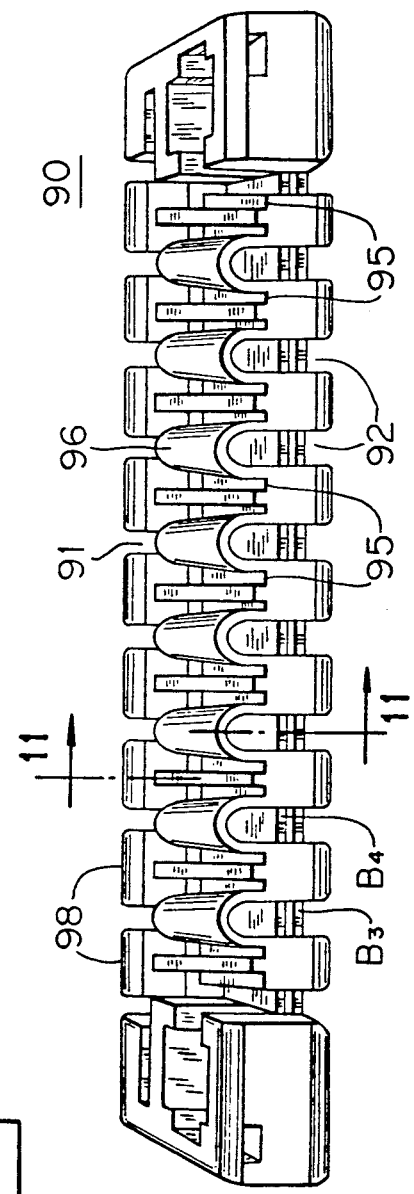
Fig.10A
Fig.10

PROCESS FOR INSERT MOLDING WET-SHAVING RAZOR UNIT

This application is a continuation-in-part of U.S. patent application Ser. No. 165,859 filed Mar. 9, 1988, now abandoned, and its parent, U.S. application Ser. No. 088,388 filed Aug. 21, 1987, now abandoned, and its parent U.S. application Ser. No. 042,493 filed Apr. 24, 1987, now U.S. Pat. No. 5,053,178, the later-filed cases each being continuation-in-part applications of their respective predecessors. This application is also a continuation-in-part of commonly-assigned U.S. application Ser. No. 236,969 filed Apr. 26, 1988. Each of the predecessor applications cited above is incorporated herein by reference.

BACKGROUND OF THE INVENTION

The present invention relates to the art of wet-shaving and, in particular, is concerned with manufacturing a shaving unit, such as a disposable razor or a cartridge, by molding a thermoplastic material around the blade (or blades) so that the edge is protected during molding and exposed for shaving in the final product. Injection of a thermoplastic material around prefixed plastic or non-plastic parts to provide a composite article having a desired geometry can be referred as to insert molding.

Currently, wet-shaving units, such as disposable razors and cartridges, form a substantial portion of the demand of wet-shaving market.

With the exception of the blade or blades (and possibly a spacer) these units have been made out of thermoplastic material. The cap and blade support or seat components, depending upon the ultimate design, are molded separately and then assembled. For example the "MicroTrac" disposable razor manufactured by Gillette holds a single unit blade seat, back and cap, with the cap including outwardly extending fingers. The blade subassembly, consisting of two blades and a spacer, is inserted between the molded cap and seat with the finger-like projections extending from the top of the cap serving as leaf springs to retain the blade subassembly. This combination is then mated to a handle by press fitting into the blade subassembly. It is apparent that this process involves not only separate steps, but separate work stations requiring individual subassembly and ultimate assembly.

Other assembly processes for shaving units utilize projections extending either from the cap or the seat, which mate with openings in the opposing part and position the blades and/or spacer. The handle is usually made separately from the seat portion. Again, separate assembly steps at separate locations are required to produce the disposable razor.

A significant problem occasioned in the manufacture of wet-shaving units is the difficulty in establishing a reproducible shave geometry which provides optimum blade edge performance. Shave geometry relates to the spatial relationship, e.g., distance, angles(s), etc., of the surface(s) and blade edge(s) as they come into contact with the skin. Inherently, separate fabrication and assembly required to produce wet-shaving units detracts from the ability t precisely reproduce a selected shave geometry. Manufacturing such units also requires continuous vigilance to ensure quality control. Usually such vigilance translates into increased cost of production which results from additional labor.

Furthermore, blade edge performance relates to the response of the blade edge to forces imparted to it during shaving. Undue or uncontrolled vibration of the blade as it is drawn across the skin, sometimes referred to as "chatter," has been blamed by some experts as detracting from the feel of the shave and causing injury to the user. Separate fabrication and assembly required in known methods of manufacturing wet-shaving units are inimical to reducing "chatter" during shaving. Even minor tolerances built into mating parts for assembly will contribute to "chatter."

Consistently reproducible shave geometry has been improved to a certain extent by use of molded plastic parts having consistent dimensions. Quality assurance, however, still requires constant monitoring of production to ensure fabrication and assembly of parts are consistent. Overall blade edge performance has not been significantly improved by mere use of molded plastic parts.

Presently, there are no known hard and fast technical theories with respect to blade edge performance, but certain design characteristics are believed to enhance performance of wet-shaving units. Constant shave geometry whereby the spatial relationship of the skin-engaging portions, the seat, the cap, and the blade, are maintained over the entire length of the blade is certainly very important. In most cases, the blade over which constant shave geometry need be maintained is in a flat configuration with the edge having the profile of a straight line, although some artisans also recommend that the blade have a crown in the central portion for optimum shave feel. More recently, the discovery by the owners of the present technology of a flexible wet-shaving unit which deflects in response to forces imparted during shaving has required that shave geometry be maintained over the length of a blade which experiences a changing profile.

Regardless of the selected blade profile, it is substantially universally agreed that, in addition to maintenance of shave geometry, the blade edge should not be distorted from the edge profile, whether it is rigid or flexible. In the case of a flexible cartridge, although the entire cartridge body bends in response to forces during shaving (i.e., has a changing profile), the blade(s) should not deviate out of the fixed geometry of the shaving unit. Such blade distortion can easily result from several manufacturing difficulties. For example, care must be given to carefully matching mating parts during assembly of shaving units. Again, such care generally requires labor intensive quality assurance measures.

Vibration of the blade results from several structural features. One kind of vibration can be described as a "clam-shelling" affect of the subassembly components vibrating with respect to each other. Another vibration is that of the subassembly moving as a single component of the total razor unit. The cantilever configuration of the blade (and/or the blade subassembly) extending from its point of securement toward the unsupported edge contributes to this undesirable vibration. The inherent looseness of components in assembled wet-shaving units is yet another source of vibration. It is desirable, therefore, to minimize or eliminate one or more of the causes of vibration.

Still another source of vibration is caused by the blade engaging hair growing out of the skin surface. Recovery time of the blade should be minimized. This quick recovery may be characterized as stiffness.

In order to cure these problems, a disposable razor which could be assembled at a single work station having all the plastic parts assembled at one time or produced in a single cavity is desirable. The steps of subassembly, final assembly, as well as inspection, and conveying of the various components from location to location in and about the manufacturing area ar thereby eliminated. Prior art patents have disclosed various attempts to accomplish this.

U.S. patent application Ser. No. 615,603 filed in the name of Ernest F. Kiraly, et al. on May 31, 1984 describes a razor with a blade having a slot. According to the application the blade is permanently secured in the head portion of the razor and the handle and guard portion are molded integrally with the head.

British Patent 1,565,296 discloses making a unitary handle guard member and blade support and then attaching a z-shaped blade by upset rivets or the like to the support.

U.S. Pat. No. 4,489,626 issued Dec. 27, 1984 to Lembke describes a razor manufacturing process in which a double edged strip of blade metal is parted along a center line and cropped to form two strips, each containing a series of spaced apart blades connected by webs to an elongate backing strip. The strip of razors must be modified before subjecting it to molding thermoplastic material around the blades. Each modified strip, which then consists of a plurality of blades and a backing strip, is fed into a molding machine in which either the shaving unit or blade-containing-component of a razor is molded directly around each individual blade. The web is then parted to release the molded razor, etc. from the backing strip. It is unclear, according to Lembke, how the remaining razor components are manufactured. It is apparent, however, that the molding process relies, in part, on the blade being supported by metal connecting elements, e.g., webs 18, 24, et al. Lembke, therefore, requires the handling of an elongated metal strip, its control and insertion in either a multi-cavity mold or a single cavity mold, and in either case a sequential step of separating heads joined together in a single strip. Conveyance of a metal web of the type described is extremely difficult when it is necessary to protect a delicate cutting edge and even more so when two cutting edges must be protected. Moreover, a subsequent operation of separating the molded razor heads from the continuous strip must be performed. Thus, the Lembke process cannot be used to effect insert molding of an independent single or twin blade unit while maintaining a desired blade geometry, especially in a high speed process which will accommodate unit production in conjunction with existing razor blade manufacturing lines. Moreover, the need to control the elongated metal strip in the Lembke technology makes it unattractive for manufacturing, and it is not presently conceivable how the Lembke procedure could be adapted to producing twin blade products.

Other patents disclosing molding a plastic razor head around a blade are U.S. Pat. No. 3,070,883 (Grathwohl); U.S. Pat. No. 2,789,246 (Algier, et al.); and U.S. Pat. No. 3,703,765 (Perez).

Co-pending patent application Ser. No. 042,493 filed Apr. 24, 1987 describes the concept of forming a center mandrel of thermoplastic material and utilizing the combination of the blade and the center mandrel as a template-male mold member for subsequent molding of a compatible cap and blade support. This was a first attempt to overcome the problems associated with blade unit assembly and resulting inconsistency in blade performance. Although the technology reported and claimed in this first predecessor application indeed improved the wet-shaving assembly product, there still existed a need to eliminate an additional process step and further stabilize blade contour and performance.

In continuation-in-part application, Ser. No. 088,368 filed Aug. 27, 1987, an improved process was set forth which includes 1) supporting the blade with the mold by "butting" it against a forked member and clamping the blade at notches along each side, 2) forming the unitary blade support means and covering means by introducing thermoplastic material into the mold, and 3) mating the unitary means with a handle. Once again, improvement was achieved in product and process, but in order to successfully manufacture high quality units consistently at a commercially attractive production rate, the inventors continued to refine the concept of maximum blade stability in a single (or minimal) step process. Thus, continuation-in-part application, Ser. No. 165,859 filed Mar. 9, 1988, included the feature of protecting the "exposed" cutting edge of the blade in the method claim, and continuation-in-part application, Ser. No. 236,969 filed Apr. 26, 1988, is directed to a method which includes 1) supporting the blade within the mold on a forked member, 2) forming a unitary blade support and covering means, and 3) mating the unitary means with a handle.

While each of the above disclosures sets forth related techniques and products therefrom which are directed toward reducing the steps required to manufacture high quality blade assemblies consistently at a commercially-acceptable production rate, they do not appear to have provided the ultimate guidelines for adapting current blade production technology to an efficient method for high volume manufacture of shave-assembly units.

The present invention overcomes the problems described above which are encountered in known procedures, and results in optimum production of consistently high quality blade assemblies.

SUMMARY OF THE INVENTION

The present invention is a wet-shaving razor unit having at least one blade with an exposed edge for shaving which includes a substantially continuous thermoplastic body and wherein the blade is secured substantially rigidly against movement and vibration during shaving. The body includes skin-engaging portions which provide a constant shaving geometry over the length of the blade for cutting hair from the skin. The razor unit can also include a razor handle so that it is ready for use by the shaver upon removal from the mold. Alternatively, the razor unit can be a cartridge which is attached onto a handle held by the shaver.

In a preferred embodiment, the razor unit can also include a wet-shaving aid secured to a skin-engaging portion, such shaving aid having a skin lubricant which is lubricious when wet. Polyethylene oxide is an example of a shaving aid which provides a lubricant between the skin-engaging portion of the shaving unit and the skin. In order to provide the shaving aid described above, the shaving aid can be adhered to a skin-engaging portion or can be mechanically restrained against removal by stakes or tabs which are deformed to overlie the shaving aid and secure it against the skin-engaging portion. The shaving aid can also be incorporated into a skin-engaging portion of the wet-shaving unit. In a preferred embodiment, the shaving aid can be deposited in a cavity provided in the skin-engaging portion such as by sequentially molding polyethylene oxide as a thermoplastic material into the cavity after formation of the shaving unit.

The razor unit of the present invention can be manufactured by supporting the razor blade while simultaneously protecting the cutting edge of the blade within a mold for the unit. The thermoplastic material which forms the continuous body portion of the shaving unit is injected into the mold and is prevented from engagement with the blade edge by male mold parts which are arranged so that they do not contact the edge of the blade. In this way, the delicate edge provided on the razor blade is protected from damage during molding.

It is important to the present invention that the razor blade itself be supported during molding against deformation of the blade edge profile in the presence of extremely high pressure, even up to 20,000 psi without deformation. In concept and practice, the blade must be arranged to eliminate any unbalanced force sufficient to shear the thin metal, e.g., approximately 0.004 inch, or deform it. This has been achieved in the present invention by simultaneously providing mechanical buttressing such that the blade forms part of the male mold member against pressurized thermoplastic material, and equalizing the force of the pressurized material on both sides of the blade. Thus, the entire length and width of each blade is positioned to bear against the blade support mold member in such a way that either the mold itself is in direct contact with the blade surface or the pressurized thermoplastic material impinges on both sides of the blade substantially simultaneously to provide equal opposing force on the blade during molding. In order to achieve the unique process and product resulting therefrom and protect the fragile blade edge, the present invention includes the concept of utilizing the blade itself as a valve in conjunction with the male mold member to protect the edge and direct the flow of thermoplastic material.

In a twin blade system the male mold member includes additional finger mold elements which are interposed between the first and second blades. The second blade must be supported by the finger elements during molding just as the first blade is supported. Thermoplastic material must also be permitted to be injected between the first and second blades in order to secure the twin blade product against profile distortion and unwanted vibrational frequency response during shaving. A preferred embodiment of the invention also provides that mold finger elements extend through the rear of the unit to permit flow-through rinse slots in the final product. Moreover, in order to enhance the exquisite control required for such detailed molding, the present invention has provided for the use of the molded plastic to serve as a guide for accurate removal of male mold members so that efficient manufacturing can be implemented. This feature provides positive control over high speed removal of male mold members while preserving both blade edge and shave geometry.

Another preferred embodiment of the invention provides that the mold include a continuous cavity to provide a handle of the wet-shaving unit as well as a connecting member to extend from the handle to the shaving head.

In yet another preferred embodiment, the shaving unit can be a flexible shaving cartridge for fixing on a shaving handle. The same concept will apply except that the thermoplastic material will be formed with a series of discontinuities over the length of the blade so that the cartridge will bend to conform to contours on the face.

In the case of providing a twin blade flexible shaving cartridge, other inventive concepts relating to accommodating parallel flexible blades apply to making the final product. For example, one end of each blade in the flexible twin blade cartridge can be made to be relatively free to move so that constant shave geometry is maintained over the entire length of the blade during flexing. Preferably, the opposite end of each blade is free to move. In one embodiment, this feature has been achieved by providing a slightly elongated opening through which one of two positioning pins is passed during molding. Inasmuch as the distance from the blade edge to the center line of the positioning holes (and pins) is critical to preserve shave geometry during fabrication, the opening must be elongated only in the direction parallel to the blade edge.

Furthermore, since the pressurized thermoplastic material must be quickly directed to both sides of the blade so as to impinge on the blade substantially simultaneously, the method of manufacturing also includes provision of a mold cavity channel which runs along the length of the mold cavity. Ports extend from the channel to selected openings in the cavity whereby thermoplastic material can be forced under pressure to the entire cavity substantially simultaneously. A further inventive refinement includes the provision of a plastic step in the channel against which a male mold surface will bear to remove the finished thermoset product.

The product, once set, can then be expulsed from the main mold cavity by a combination of process features. First of all, the entire molded product along with the excess plastic can be held in place by the plastic step referred to above, while one member of the mold is removed. Then other mold members can be removed to provide clearance for expulsion of the product. Substantially simultaneously, the plastic set in the gates through which the material was introduced is severed. Finally, the product is pushed out of the main mold cavity by mechanical pusher elements without damage to the finished edge. This series of events can be provided synchronously to efficiently remove each product unit.

As a result of the unique production method of this invention, a wet-shaving razor unit can be efficiently made by one-shot insert molding in a continuous process. The resulting shaving unit has a blade or blades secured against vibration during shaving and aberrant frequency response is minimized. Furthermore, the inventive method allows the manufacturing of the shaving units to be integrated with existing razor blade production lines.

For a better understanding of the present invention, together with other and further objects, reference is made to the drawings along with the detailed description which follows.

BRIEF DESCRIPTION OF THE DRAWINGS

A brief description of the drawings are provided herein, but those skilled in the art will understand that other and further embodiments may be employed of which the preferred embodiments are representative.

FIG. 1 is a front perspective view of the head of a single blade shaving unit prepared in accordance with the present invention;

FIG. 1A is a rear perspective view of a whole shaving unit such as that shown in FIG. 1;

FIG. 2 is a front perspective view of a shaving unit with twin blades prepared in accordance with the present invention;

FIG. 4 is a bottom perspective view of the shaving head portion of the razor unit of FIG. 1;

FIG. 5 is an enlarged perspective partially broken away taken along line V—V of FIG. 4;

FIG. 6 is an elevated sectional view of the blade supported in the mold for casting the thermoplastic razor unit of FIG. 1;

FIG. 6A is an enlarged partial view of the encircled detail 6A shown in FIG. 2;

FIG. 7 is a bottom perspective view of the twin razor unit of FIG. 2;

FIG. 10 is a bottom perspective view of the twin blade flexible razor unit of FIG. 3;

FIG. 10A is a bottom perspective view of the twin flexible razor unit of FIG. 3A;

DETAILED DESCRIPTION OF THE INVENTION

Figure 2A:
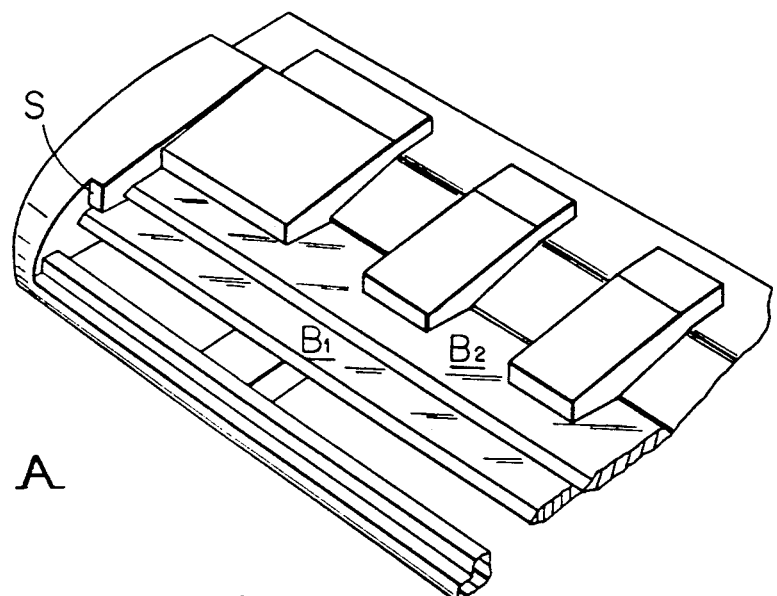
FIG. 2A is an enlarged partial view of the encircled detail 2A shown in FIG. 2.

The present invention involves the concept of providing a wet-shaving unit which can be conveniently and accurately manufactured with a constant shave geometry over the length of the blade(s). Moreover, the resulting product experiences little or no vibration during use. Manufacturing processes to date include the use of singly or multiply supported blades in combination with molding techniques and subsequent assembly techniques for providing the razor unit. The method disclosed herein, however, eliminates the need for molding separate parts, and then assembling them to form a razor unit.

In the "MICROTRAC" razor, where the cap, back and support structure are molded as a single unit, the seat portion has a center support connected to the back position of the seat by as many as 13 transverse ribs, which serve as leaf springs in conjunction with the fingered cap. Because the blades are held by springs and lugs at either end the blades tend to "chatter," i.e., vibrate during shaving. Furthermore, the support bar in the "MICROTRAC" configuration as viewed from the front is ramped downward to aid in blade assembly insertion in the premolded razor head. The bar only provides support at the apex of the ramp, which exacerbates this problem.

The wet-shaving razor unit of the present invention, however, anchors the blade to continuous thermoplastic body by, among other things, the plastic flowing through blade holes, and the unique insert molding scheme which integrates the blade into the male mold member itself. Consequently, the thermoplastic material injected into the razor-bearing mold, even up to pressures of 20,000 psi, is forced over and around the blade as if the blade were one with the mold. This results in a wet-shaving unit which has a smooth consistent edge profile and has minimal aberrant frequency response during shaving.

Referring to FIGS. 1 and 1A, a single razor unit 10 is shown which was made by a single-shot molding technique in accordance with the present invention. The head 12 has been molded along with the handle as a single unitary piece which includes a cap 22 attached to a blade seat 15 by a continuous thermoplastic body which extends around the rear portion of the blade B to form back 9. The continuous thermoplastic body also includes connecting thermoplastic tabs extending through blade slots to join the cap 22 to the blade seat 15. Furthermore, plastic anchors have been injected into blade openings thereby anchoring the blade securely against both longitudinal and lateral movement.

Referring to FIGS. 4 and 5 in conjunction with FIG. 1, the blade support portion can be clearly seen as including a linearly extending rear bar 17 which forms the bottom of back 9 and is connected with a linearly extending support bar 18 by means of ribs 19. Progressing toward the front of the blade where the guard bar 21 is located, ribs 20 can be seen extending from bar 18 to the bottom of the guard bar 21. The back 9 of the razor head is a continuous body which extends from the blade seat 15 to the cap member 22. The cap 22 is formed with overbite securing fingers 23 and side members 24.

There are several factors which contribute to difficiencies in wet shaving units which have been overcome by the present invention, one embodiment of which has been described above with reference to FIGS. 1, 1A, and FIGS. 4 and 5. One of the important factors in the present invention is the mechanical intimacy between the contacting surfaces of the blade and the plastic. If the blade and surrounding plastic ar molded and act as a single unit with no space between the surfaces, vibration resulting from similar razor construction having even minute spaces between the contacting surfaces is eliminated.

The present invention provides this valuable blade-plastic intimacy. One important aspect of the invention is that the insert technique avails itself of the natural shrink occasioned by setting thermoplastic material. This provides a very tight package in the end product. As a further consequence of the natural shrink, the inventors can, and have been able to, engineer the precise edge profile desired. Once again, these phenomena can only be taken advantage of as a result of the insert molding process disclosed herein.

Another deficiency in blade characteristic which can be eliminated is that of deviation of the blade edge out of its designed profile. This deficiency has been referred to herein as blade distortion.

These deficiencies have been overcome in the present invention by providing a method and shaving unit product wherein the blade or blades are secured against any movement whatsoever during molding and afterwards by stable continuous support. In order to achieve this, the inventors had, in the past, provided minimal amount of blade seat body in the final product, replacing blade seat body (i.e. plastic) during molding with a supporting surface of the male mold member. It was reasoned that since the area and positioning of the support during molding protects the blade from distortion, larger open areas in the blade seat as molded are preferred. To that end, it was disclosed in a commonly-owned co-pending application that the area of male mold support surface be about equal to that of the blade seat, about equal meaning that the open area formed from the support surfaces be between 40 and 60 percent and preferably between 45 and 55 percent of the total blade surface area. This phenomenon has been found to be effective, and high quality wet-shaving products having excellent rigidity with virtually no vibration during use have been made as seen in FIGS. 1, 1A (and FIGS. 4 and 5).

However, it has now been discovered that the required support required during the molding process can be provided by means other than contact with the surface of the male mold member. In particular, it has been found that if high pressure thermoplastic material can be provided equally on both sides of the razor blade during the instantaneous molding process, the blade will be adequately supported. That is to say that the blade itself will undergo no distortion whatsoever, and there will be even greater area of blade to plastic body securement to prevent distortion and vibration. Quite simply, the blade will be surrounded by a greater amount of continuous thermoplastic body on both sides. Moreover, the length of the blade extending forward from its point of securement is reduced so that any vibration resulting from forces against its edge are reduced.

FIG. 6 is a sectional view of the blade supported in the mold for casting the thermoplastic razor unit of FIG. 1. The area of the rear end of the blade which is secured by thermoplastic material is significant with respect to the entire width of the blade.

FIG. 6A is a detail of FIG. 6 which shows how the molding techniques of the invention simultaneously provides protection to the edge E and permits equivalent force to bear against opposite blade surfaces at all times. In particular, the mold includes male mold members $M_1$, $M_2$, and $M_3$ with cavities 9', 18', 21' and 22'. The cavities are in fluid communication with each other, but the edge protection cavity E' is not in fluid communication with any other cavity. Specifically with reference to FIG. 6A it can be seen that cavity E' ends by the joining J of male mold members $M_1$ and $M_2$. Consequently, when the blade B is fixed in the mold, the blade itself acts as a valve to cut off flow of thermoplastic material to the edge area of the blade thereby protecting its exquisite finish during molding. This is on of several key factors in achieving the very dependable high speed process and excellent product of the present invention.

Consequently, the blade will be mechanically buttressed during the entire molding process by the combination of male mold members and thermoplastic material under high pressure impinging on both surfaces of the blade substantially simultaneously during the molding process. In FIG. 7 the results of this technique can be seen. The combination of positioning anchors 13 and the use of the cap and cap fingers 22 extending in the direction of the blade edge beyond the cap seat, the blade within the head assembly is significantly rigidified. As a result of this invention, the blade B is highly secured against movement, and the shaving geometry is maintained to within a high degree of accuracy along the entire blade length. Applying the concept of the present invention to making razors has resulted in products which are quite superior in use, i.e., during shaving. Moreover, the molding procedure herein can be easily integrated in a manufacturing configuration with well known razor blade production methods and machinery. Once established, the present invention provides a very inexpensive method for continuous manufacture of consistently high quality razor units.

In the past it was found that in order to successfully mold a unitary cap and cover utilizing the blade as a portion of the male mold member, it was necessary to support the blade against the force generated by inflowing thermoplastic material primarily by male support members. While this theory is true in and of itself, it has now been discovered that portions of the male mold support can be replaced by equal force of thermoplastic material on either side of the blade. This can be achieved by providing mold cavity on both sides of the blade combined with a delivery system whereby thermoplastic material under pressure is delivered substantially simultaneously to both sides of the blade.

In FIG. 4 it can be seen that a good deal of the mechanical support to the blade has been provided by thermoplastic material substantially equally distributed on both sides of the blade. The open areas of the central razor body illustrated in FIG. 4 represent those portions of a blade which are in direct contact with the male mold member during molding. Consequently, when using thin blade technology, the present invention permits significant reduction of the mass of the razor unit.

Figure 14:
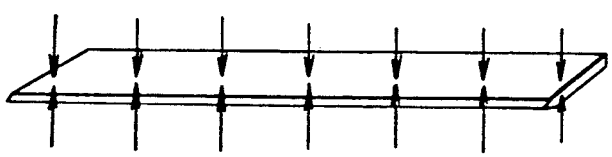
FIGS. 14A and 14B are diagrammatic representations depicting the mechanical requirements for the concept of the present invention.
Figure 14:
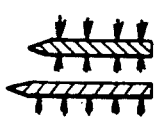

In concept, the blade should experience forces during thermoplastic molding diagrammatically represented in FIGS. 14A and 14B. The force vectors shown in this representation can be provided by male mold members and by thermoplastic material on either side of the blade substantially simultaneously injected thereabout by the injection molding procedures of the present invention.

Figure 8:
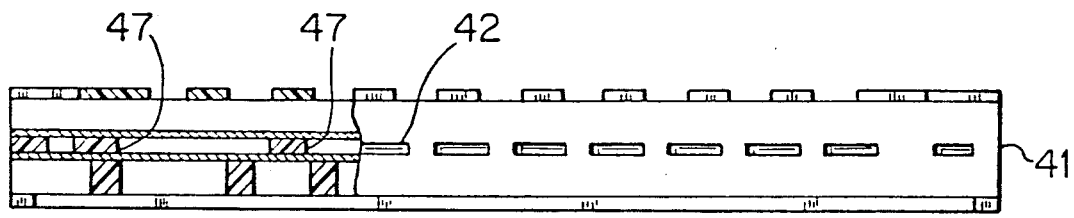
FIG. 8 is a rear elevational view partially broken away along line VIII—VIII of the twin razor unit of FIG. 2.

Referring now to FIG. 2, a twin razor unit 30 is shown in which the head portion 32 is injection molded and has been subsequently attached to the handle portion 31. There are two blades a seat blade $B_1$ and a cap blade $B_2$ arranged in the shaving head 32 between the cap 34 and seat 35 in a constant shave geometry over the entire length of the twin blades. Referring to FIG. 7 along with FIG. 2, the seat 31 can be seen having a rear portion 36 connected to a middle bar 38 by ribs 37, and the guard bar 39 is connected to the middle bar 38 by ribs 40. Referring to FIG. 8, an additional feature, which can be provided in accordance with the present invention, is a flow-through feature provided by rinse slots 42 extended from front to rear of the blades and exiting from the back 41 so that water and debris resulting from shaving can be rinsed therethrough.

The principles and the concept of molding set forth hereinabove with respect to the single blade system is equally applicable to the twin blade system. However, the mold configuration for the twin blade system is more intricate. In particular, a mold support must be provided between the blades during molding preferably from front all the way to the rear male mold member so that the rinse slots are formed. The resulting structure also includes support fingers 47 (FIG. 8) between the blades.

As in single blade razor production, the concept for effecting an intricate twin blade shaving unit includes the use of male mold members and the delivery of high pressure thermoplastic material substantially simultaneously on both sides of the twin blade arrangement.

Figure 9A:
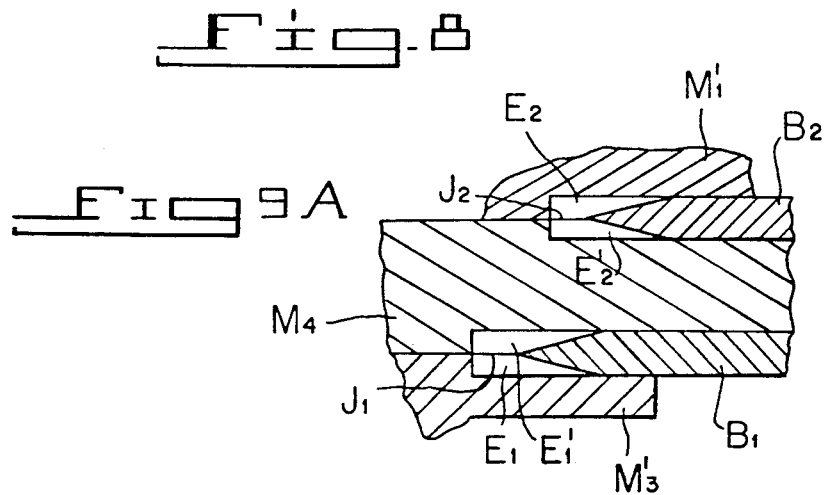
FIG. 9A is a enlarged partial view of the encircled detail 9A shown in FIG. 9.
Figure 9:
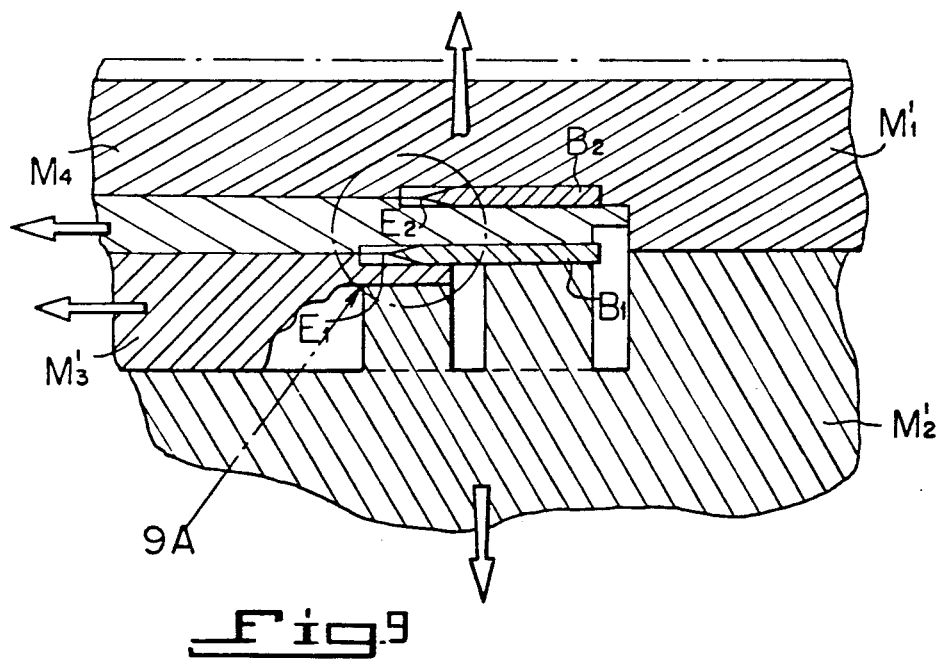
FIG. 9 is a sectional view of twin blades supported in the mold for casting the thermoplastic razor unit of FIG. 2.

Referring to FIG. 9 and 9A, a side elevational section of the mold is shown with the twin blades included for injection molding. It can be seen from this view that the edges $E_1$ and $E_2$ of the twin blades $B_1$ and $B_2$ are protected by male mold members $M_1'$, $M_2'$, $M_3'$ and $M_4$ which contact the blade somewhat removed from the edge and provide cavities $E_1'$ and $E_2'$ around the edges. The cavities $E_1'$ and $E_2'$ are closed at either end by the junction $J_1$, between male mold members $M_3'$ and $M_4$, and $J_2$ between male mold members $M_1$ and $M_4$.

Figure 12A:
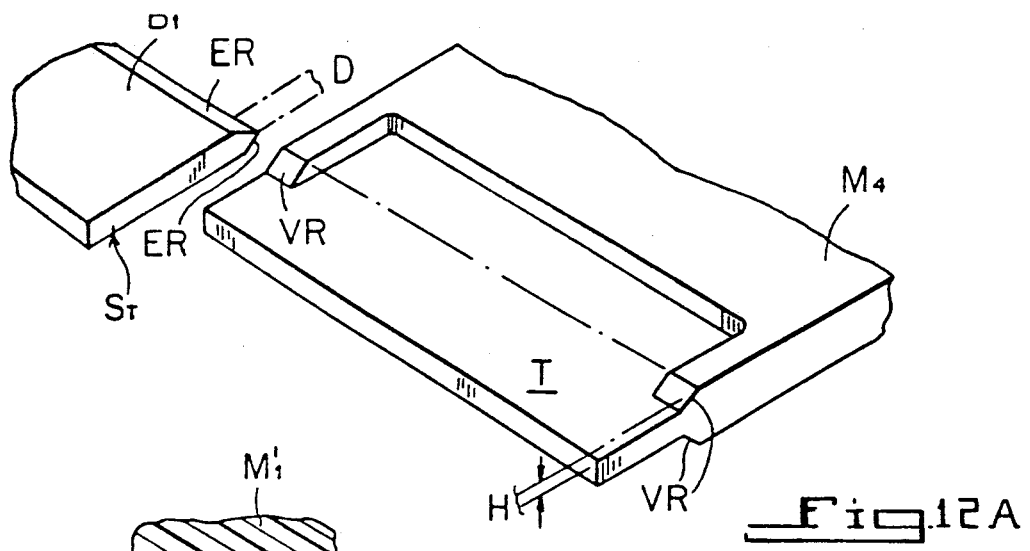
FIG. 12A is an exploded diagrammatic perspective view of the valving combination used to implement the present invention.
Figure 12B:
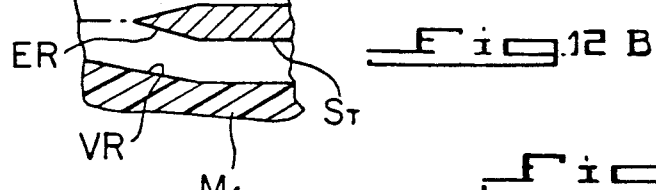
FIG. 12B is a representation of the valve mechanism provided by cooperation of the elements set forth in FIG. 12A.
Figure 12C:
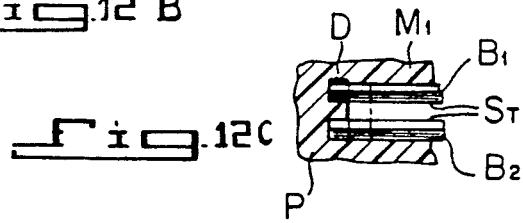
FIG. 12C shows the molded product in elevated partial cross-section which results from the valve mechanism of 12A and 12B.

The blades $B_1$ and $B_2$ themselves form valves which prevent the flow of thermoplastic material into the edge-protecting cavities. This concept is clearly illustrated in FIGS. 12A-C. FIG. 12A is an exploded diagrammatic representation of the male mold member $M_4$ and a blade $B_1$ which provides a valve to prevent flow of thermoplastic material during molding. FIG. 12B is an elevated side sectional view of members $M_1'$ and $M_4$ in spaced relationship before molding. Junction line $J_2$ is shown in phantom.

Member $M_4$ is formed with a center tongue T against which one surface $S_T$ of each blade is intimately contacted during molding. At each end on both sides of the mold member $M_4$ valve ramps VR are formed against which blade edge ramps ER bear during the molding procedure. The mold member $M_4$ is sized and positioned so that the blades extend beyond the end of the member $M_4$ a distance D which sufficient to secure the ends of the blades in thermoplastic material P. (See FIG. 12C). The member $M_4$ must be provided with exquisite detail since the dimensions are minute. For example, blades have a thickness on the order of only 0.004". Thus, the elevation H of the valve ramps VR is only about 0.002". Consequently, extreme care must be taken during molding to protect the exquisitely detailed member $M_4$.

Figure 2B:
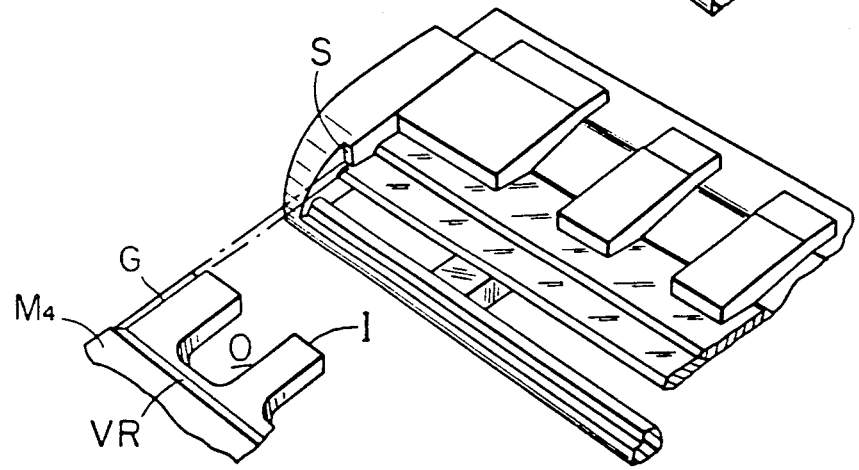
FIG. 2B is an exploded perspective view of the segment shown at 2A depicted with the male mold member in spaced relationship thereto as it is positioned between the twin razors during molding.
Figure 2C:
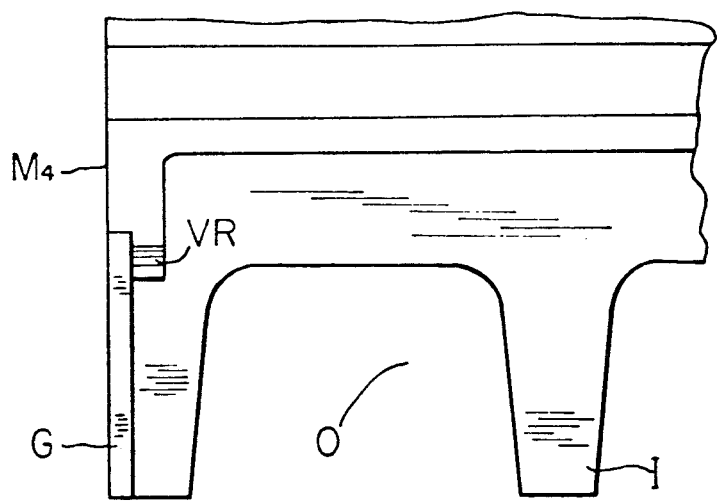
FIG. 2C is a partial plan view of the male mold member of FIG. 2B.
Figure 2D:
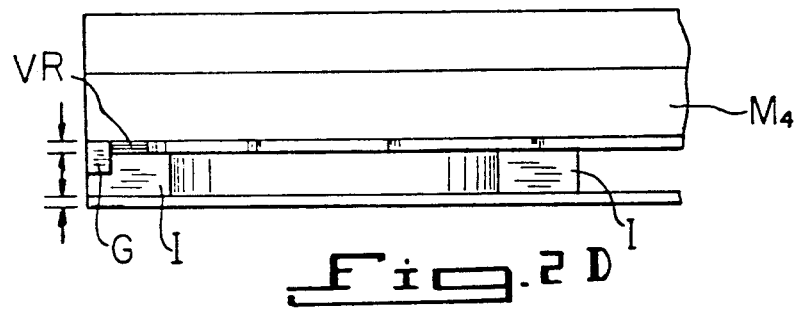
FIG. 2D is a front elevation view of the section shown in FIG. 2C.

The present invention accommodates this design feature by providing a positive guidance for mold removal. Consequently, high speed manufacturing can be used to produce the units. Referring to FIGS. 2A-D, this unique feature can be seen. In FIG. 2A a twin blade unit is shown in detail with a positive mold return step S between blade $B_1$ and $B_2$. This positive return step feature permits the member $M_4$ to be removed quickly and efficiently without danger of damaging the exquisite detail of the member. In FIG. 2B, the member $M_4$ is shown in an exploded view in spaced relationship to the completed shaving unit and in particular with respect to positive mold return step S. In this regard also refer to FIG. 2C which is a plan view of member $M_4$ and FIG. 2D which is a front elevational view of the member $M_4$. As can be seen with reference to these figures, the positive mold return step S is provided by a guide channel G formed at the end of member $M_4$. Thus, when the member $M_4$ is removed at high speed, there is absolutely no vibration since the set plastic material includes the guide step S in intimate surface-to-surface contact with the member $M_4$ throughout the removal stroke. Moreover, all vibration between the blades $B_1$ and $B_2$ is significantly reduced or totally eliminated. This feature enhances the ultimate product, since it protects the fragile edges of the twin blades in addition to protecting the mold member $M_4$. In addition, it permits the expedient expulsion of the product from the main mold body.

More specifically, once sufficient male mold members have been removed to provide clearance for expulsion of the product, mechanical pusher elements are used to engage the product and separate it from the main mold cavity. Once again as a result of the present insert molding technique, this can be achieved without damage to the blade edge because of the clearance provided therefor. Thus, the pusher elements bear against the product surface without contacting the finished edge.

Further with reference to FIGS. 2A-2D, it is noted that the tongue of the member $M_4$ has been provided with cut out sections O leaving inserts which I extend between the blades during molding. As a consequence of the cut out portion O, thermoplastic material is permitted to flow between the twin blades and form support fingers, e.g., 47. (See FIG. 8).

Figure 13:
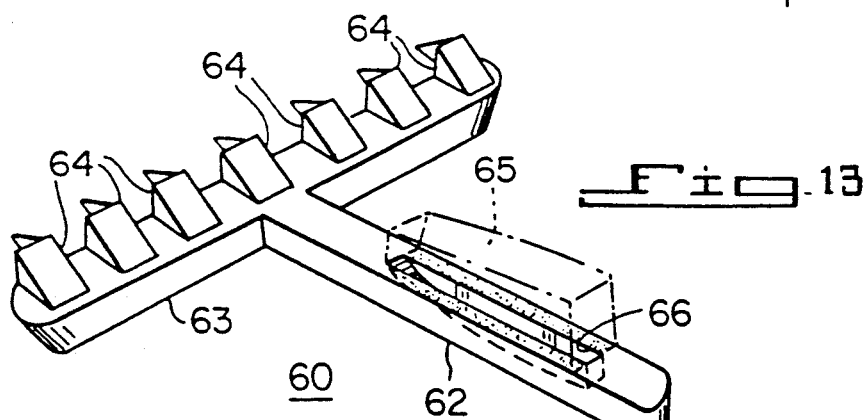
FIG. 13 depicts the portion of set plastic resulting from the access channel to the mold cavity and a portion of the male mold member used as a means of removal.
Figure 13A:
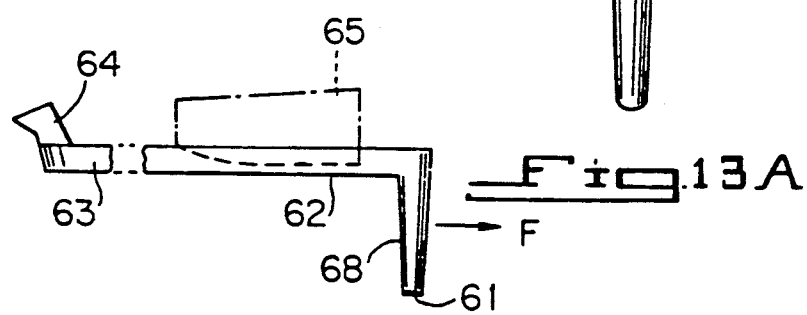
FIG. 13A shows the portion of a male mold member as it provides a removal means of the excess portion of a plastic shown in FIG. 13.

One very important element of the present invention is to provide high pressure thermoplastic material substantially simultaneously to both sides of the blades as they are supported in the mold. To that end, it has been discovered that a thermoplastic delivery system can be arranged along the entire length of the blade with delivery ports conveniently placed for fluid communication between the delivery channel and the mold cavity. Referring to FIGS. 13 and 13A, an example of such a delivery system is depicted by showing the thermoplastic waste member 60 which results from the plastic which sets in the delivery system. FIG. 13 is a perspective view of the waste material having introduction point 61 which is where thermoplastic material is introduced from a high pressure delivery means. The material then flows through a connecting conduit which results in the formation of neck 62. The pressurized thermoplastic material then flows into a delivery channel which results in bar 63 extending along the length of the wet shaving unit. Finally, the material is directed into delivery ports at selected area along the length of the mold cavity. The setting of the thermoplastic material in these individual delivery ports result in fingers 64.

After the thermoplastic material has become set, it must be removed from the finished shaving unit. Once again, in a high speed process, this can become problematic. However, the present inventors have discovered that the removal of the excess plastic resulting from the unique delivery system can be effected efficiently and at high speed by use of mechanical grabbing means in combination with a stabilizing male mold member. Referring to FIGS. 13 and 13A, such a member has been shown as mold wedge 65. Mold wedge 65 is interposed in the delivery channel (which forms in neck 62) thereby forming a stabilizing cavity 66 in the neck 62. After the thermoplastic material has set, a force F can be applied to the thermoplastic waste member 60, preferably along extension 68. This unique innovation provides for a quick and very effective waste-plastic removal technique which can be implemented at high speed without damage to the fragile wet shaving product.

While the embodiments shown herein depict the technology relating to formation of the razor head, the entire razor unit including the handle could be molded in one injection. Alternatively, the head could be molded and then attached by methods known in the art. In any event, the blades are held substantially rigid against vibrational motion and they are formed without any distortion in the blade profile whatsoever.

Figure 3A:
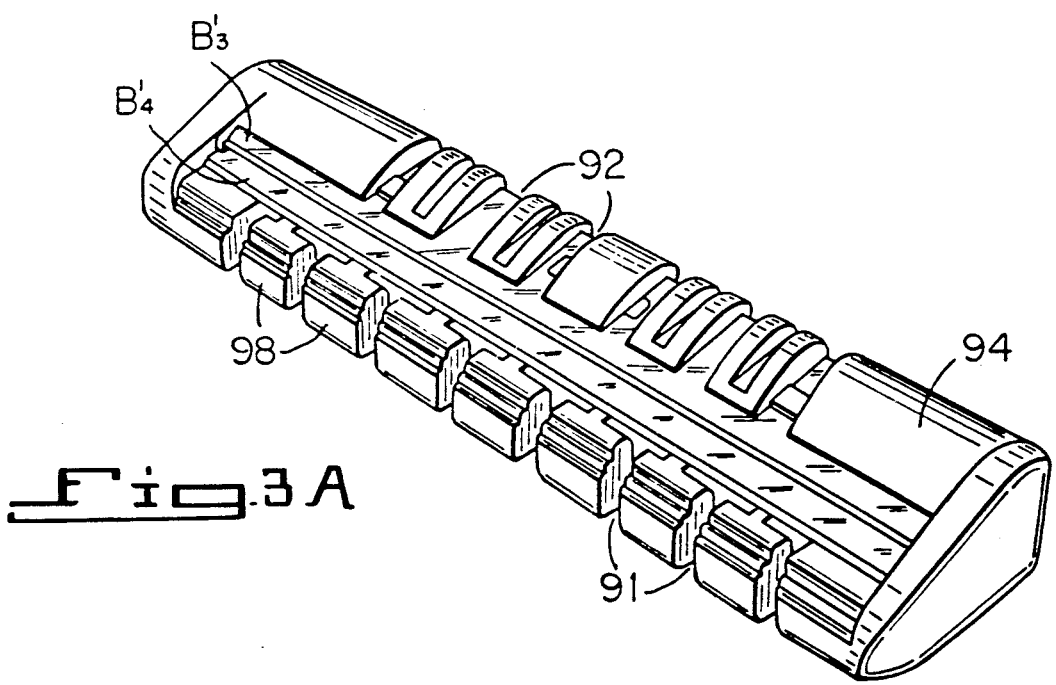
FIG. 3A is a front perspective view of a preferred embodiment of the twin flexible razor of the present invention.
Figure 3:
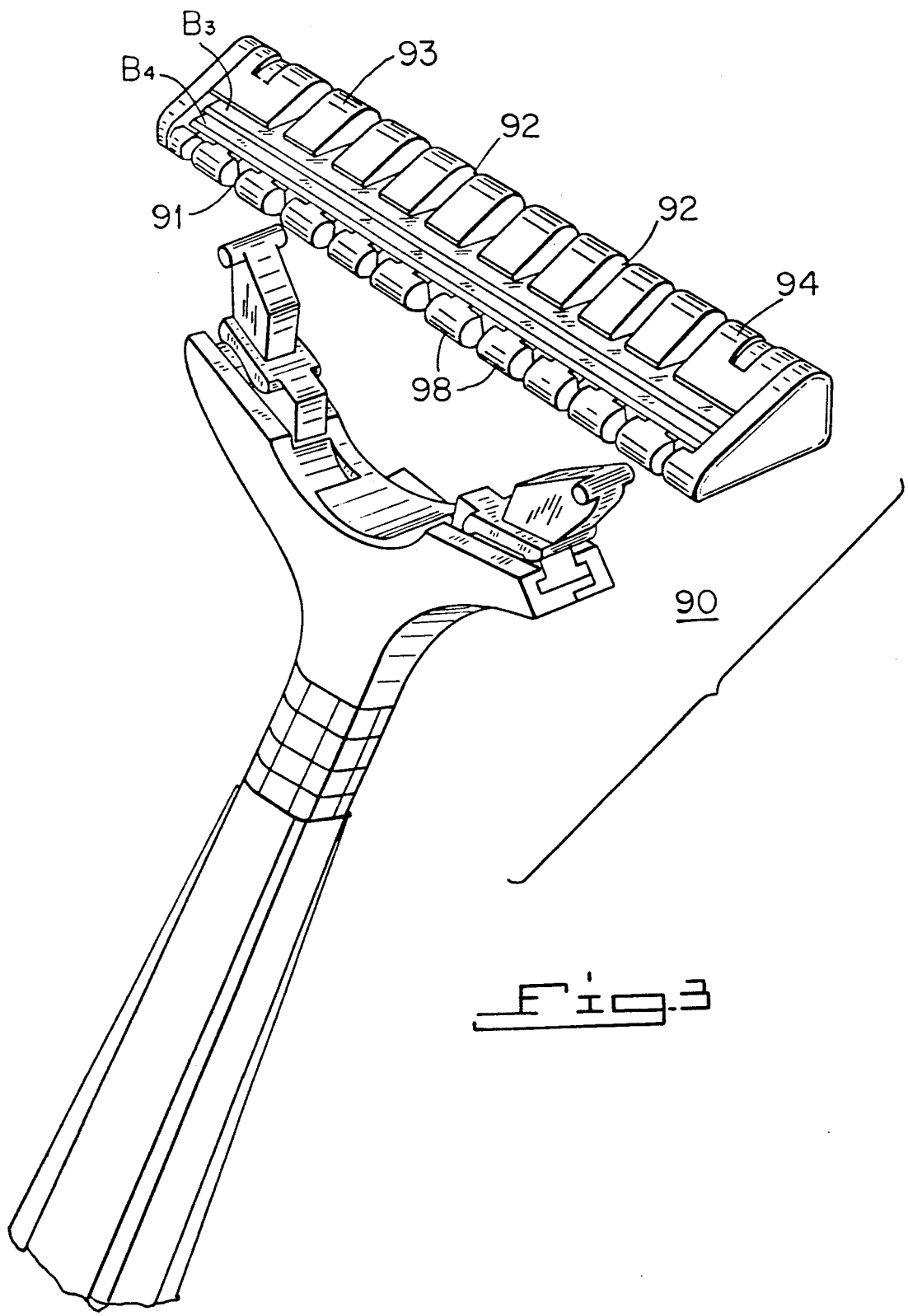
FIG. 3 is a perspective view of a twin blade flexible razor unit of the present invention.
Figure 11:
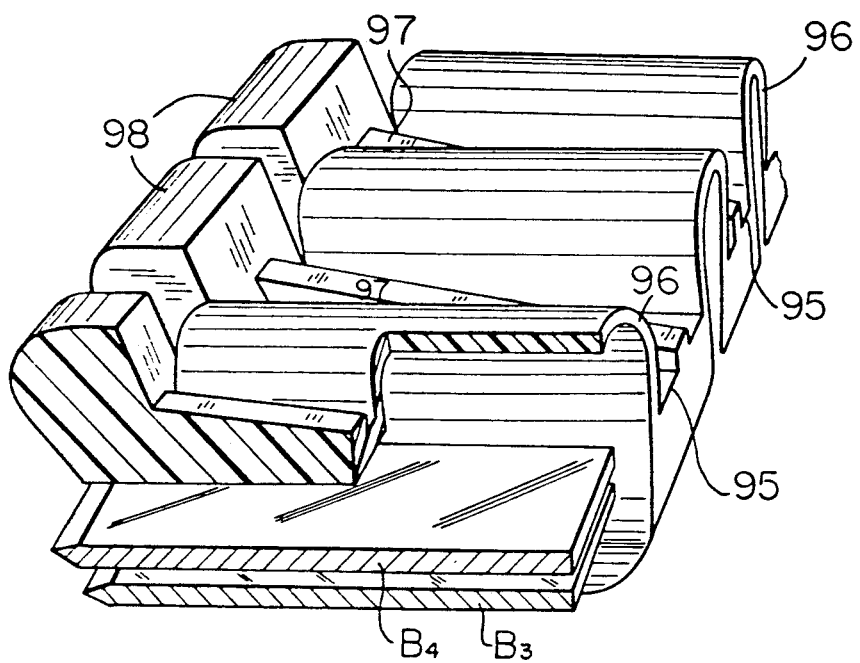
FIG. 11 is an enlarged fragmentary perspective taken along the line XI—XI of FIG. 10.

Yet another embodiment of the present invention has been discovered with respect to flexible shaving units. Referring now to FIG. 3, FIG. 10, and FIG. 11, a twin flexible razor unit prepared in accordance with the present invention is depicted. The thermoplastic material provided in this embodiment is a solid substantially non-flexible material, which is inexpensive to acquire and easy to handle in molding processes. The flexible characteristic is provided by discontinuities 91 and 92 along the length of the unit. Referring to the figures, a twin blade system having a blade B₃ and a blade B₄ is shown with a multifingered cap having overbite fingers 93 and side tabs 94. The seat of the head assembly in the drawings is shown having support planks 95 in conjunction with sinusoidal webs 96 which form living hinges on the bottom portion of the twin blade system. The planks 95 are also provided with elevated ribs 97 which support at each end thereof guard bar elements 98. Discontinuities 92 are provided in the cap member, and the guard bar is segmented or provided with discontinuities 91 so that the unit is flexible in response to forces imparted to it during shaving. The advantage of this construction is that easily molded rigid thermoplastic material can be used to make a flexible shaving unit. Another preferred embodiment is again shown at FIG. 3A and 10A wherein like members are provided with like numbers bearing a prime notation.

This flexible shaving cartridge can be single shot molded by use of a very intricate mold cavity utilizing the principles of alternating mechanical support by male mold member and mechanical support by thermoplastic material positioned on either side of the blades. Unique to the flexible cartridge shown in FIGS. 3, 10 and 11, is a flow through characteristic provided by the discontinuities in the back of the cartridge. Furthermore, the blades are supported and separated one from the other by means of support fingers that are positioned between the blades as a result of areas wherein there are no male mold support members.

Figure 15:
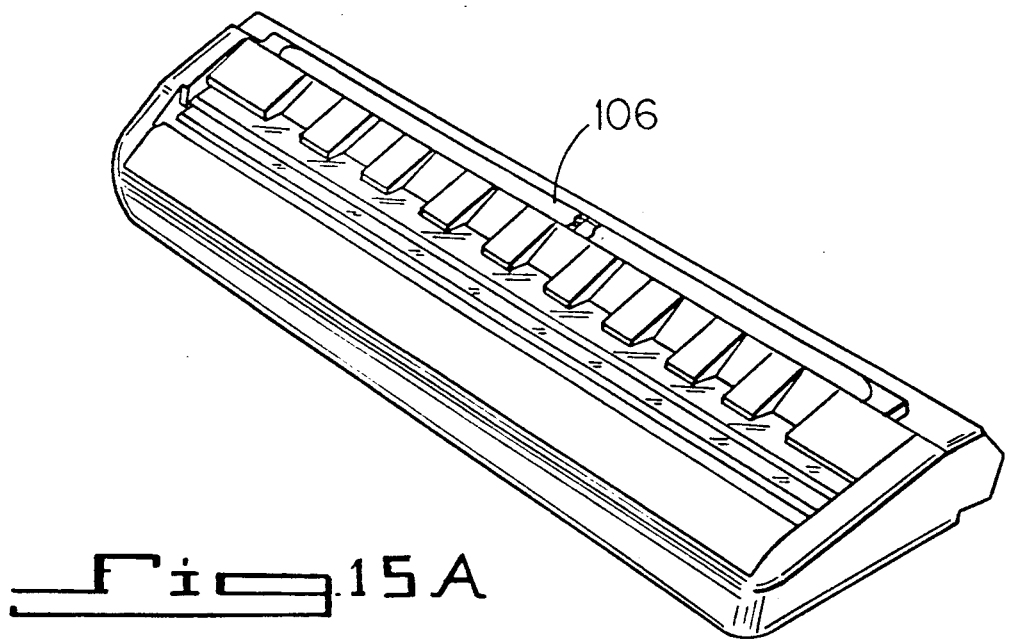
FIGS. 15A and 15B shows the embodiments which include a shaving aid.
Figure 15:
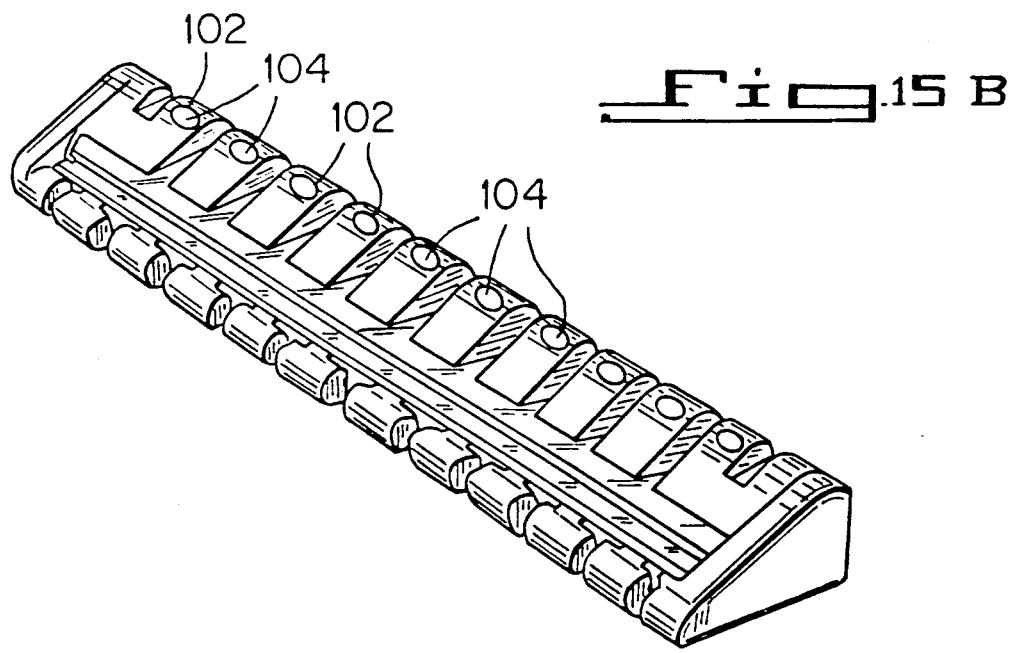

Referring to FIGS. 15A and 15B, the shaving aid feature of the invention is shown. This feature can be provided as spot cavities 102 (along either the guard elements or the cap elements) wherein shaving aid material 104, such as polyethylene oxide, polyurethane-polyvinylpyrrolidone interpolymer, etc., is deposited. Otherwise, shaving aid composition can be incorporated in the skin-engaging surfaces of the assembly or coated or adhered to such surfaces as, for example, a strip 106 shown in FIG. 15A. In any case the skilled artisan will be able to decide which skin-engaging surface(s) he or she wishes to use to deliver the shaving aid.

While there have been described what are presently believed to be the preferred embodiments of the present invention, the artisan will appreciate that there are other and further modifications which can be made without departing from the spirit of the present invention, and it is intended to claim all such further modifications as come within the true scope of the claims.

What is claimed is:

1. A method of making a wet-shaving razor unit or a cartridge unit for use with a wet-shaving razor, having at least a first blade and a second blade, each blade having an exposed cutting edge, comprising the steps of:
    (a) supporting said blades within a mold for said razor or said cartridge, with said edges surrounded by male mold members arranged to remain out of contact with said edges such that said blades are mechanically buttressed on the sides thereof and wherein said blades are provided with counterbalancing high pressure thermoplastic material on both sides during molding, so that said blades are maintained without deformation during high pressure molding, and wherein a male mold member holds said second blade in spaced relationship to said first blade, said spacer having openings for flow-through of thermoplastic material whereby supports separating said blades are capable of being formed in the said razor unit or cartridge unit, and wherein said spacer includes valving surfaces that receive the edges of said first blade and said second blade so that flow of thermoplastic material is prevented from contact with said edges; and
    (b) injecting a thermoplastic material into said mold to form said razor unit or said cartridge unit, wherein the thermoplastic material is formed around said blades and wherein said edges of said blades are free from contact with said thermoplastic material.

2. The method of claim 1 which further comprises providing a shaving-aid to said thermoplastic body adjacent said blade.

3. The method of claim 2 wherein said mold provides a cavity in said skin-engaging portion of said unit adjacent said edge and a shaving aid in the form of a thermoplastic material is deposited in said cavity subsequent to formation of said unit.

4. The method of claim 1 wherein said male mold members are provided with a guide channels for flow of thermoplastic material, said channels arranged to provide guide steps in said thermoplastic material after solidification for high speed removal of said male mold members without damage to said blades and blade edges.

* * * * *